US006142243A

United States Patent [19]

Mayer

[11] Patent Number: 6,142,243

[45] Date of Patent: Nov. 7, 2000

[54] HAND-HELD POWER TOOL, IN PARTICULAR DRILL SCREW DRIVER

[75] Inventor: Thomas Mayer, Biberist, Switzerland

[73] Assignee: Robert Bosch GmbH, Stuttgart, Germany

[21] Appl. No.: 09/233,830

[22] Filed: Jan. 20, 1999

[30] Foreign Application Priority Data

Mar. 4, 1998 [DE] Germany ........................... 198 09 133

[51] Int. Cl.$^{7}$ ........................................................ B23Q 5/00

[52] U.S. Cl. ............................................ 173/176; 173/178

[58] Field of Search .................................... 173/176, 178; 192/93.5, 150, 56.1; 81/474; 408/139; 477/178

[56] References Cited

U.S. PATENT DOCUMENTS 1,883,164 10/1932 Vassakos ................................ 192/150
3,450,214 6/1969 Bangerter et al. ...................... 173/178
3,710,873 1/1973 Allen ....................................... 173/176
4,546,833 10/1985 Berecz et al. ........................... 173/176
5,203,242 4/1993 Hansson .................................... 81/474
5,346,022 9/1994 Krivec ..................................... 173/178
5,356,350 10/1994 Schreiber ................................ 192/150
5,545,109 8/1996 Hayakawa ............................... 192/150
5,738,469 4/1998 Hsu ......................................... 408/139

FOREIGN PATENT DOCUMENTS 296 01 179 U 1 6/1996 Germany .

*Primary Examiner*—Peter Vo
*Assistant Examiner*—Jim Calve
*Attorney, Agent, or Firm*—Michael J. Striker

[57] ABSTRACT

A hand held power tool has a coupling formed for transmission of torques of different values and including at least two coupling parts provided with transmission members for rotary-fixed connection with one another, a coupling spring having an adjustable tensioning force operatable for holding one of the coupling members of one of the coupling parts in a rotary-locked engagement with another of the coupling members of another of the coupling parts, and blocking members with which the coupling parts are rotary-fixed coupled in addition to the transmission members, and which are bringable in engagement with one another in a drilling operation or an impact drilling operation for transmitting a maximum torque.

14 Claims, 8 Drawing Sheets

HAND-HELD POWER TOOL, IN PARTICULAR DRILL SCREW DRIVER

BACKGROUND OF THE INVENTION

The present invention relates to a hand-held power tool.

German reference DE 296 01 129 discloses a hand-held power tool which is formed as a screw drilling machine and has a coupling between a drive motor and a tool receptacle for transmission of different torques. The coupling has two coupling parts which are rotation-lockingly connected by transmission members. Balls are provided on one coupling part and engage corresponding arresting recess of the other coupling part. The balls are loaded with an adjustable pre-tensioning force in the engaging direction. The torque transmission between the coupling parts in the engaging direction is performed through transmission surfaces in which the transmission members contact one another. The transmission surfaces are arranged so relative to a rotary direction of the coupling, so that depending on the torque, a force is produced in direction of the disengagement of the transmission members, which counteracts the pre-tensioning force. When pressing out force exceeds the pre-tensioning force, a disengagement of the coupling and thereby an interruption of the rotary transmission occurs.

The known coupling has the disadvantage that with increasing torque, greater pretensioning forces must be provided, which are taken by the coupling parts. In the operational position for drilling in which an overarresting of the coupling is not desired, high pressing-out forces must be taken by the coupling parts, which requires a corresponding design of the hand-held power tool.

SUMMARY OF THE INVENTION

Accordingly, it is an object of the present invention to provide a hand-held power tool which avoids the disadvantages of the prior art.

In keeping with these objects and with others which will become apparent hereinafter, one feature of present invention resides, briefly stated, in a hand-held power tool in which the coupling parts, in addition to the transmission members, are coupled with at least one blocking member for joint rotation, which during drilling or impact drilling operation are bringable in engagement with one another for transmission of a maximum torque.

When the hand-held machine is designed in accordance with the present invention, it has the advantage that a combined operation is provided on the one hand for torque delivery such as during the use of the hand-held power tool as a screwdriver, and on the other hand, it is possible to operate with a rigid or approximately rigid torque coupling such as during drilling or impact drilling, so that no high disengagement forces act on the transmission members or on the coupling parts.

It is therefore not necessary to design the coupling for high disengagement forces, which requires a costly construction.

In accordance with another feature of the present invention, the transmission members of one of the coupling parts are arranged on a transmission ring. Therefore the mounting of the transmission members is substantially facilitated, since instead of a plurality of individual parts, a single ring is inserted.

The transmission members can be formed of one piece with a hollow gear of a planetary transmission. Thereby the arrangement is especially favorable for the mounting.

The blocking members are bringable, additionally to the transmission members, into their engagement position and therefore the rotary-fixed coupling of the coupling parts is possible from any torque adjustment of the overengaging coupling.

In accordance with still another feature of present invention, the blocking members are provided with blocking surfaces which are inclined relative to the rotary direction of the coupling, and in the case of high torque values, disengage relative to the transmission surfaces of the transmission members. In this manner, the function of a safety turning off is realized by the blocking members.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
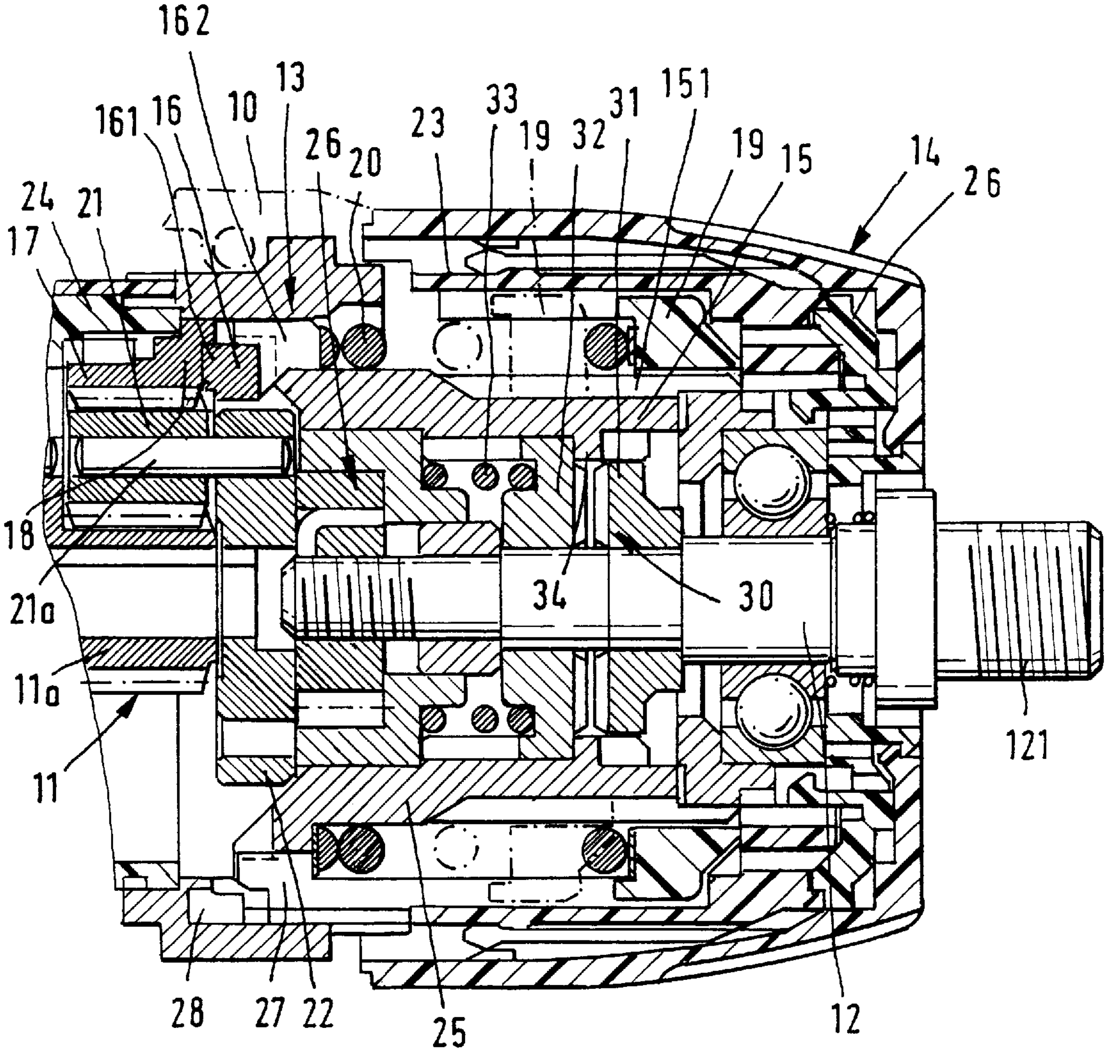
FIG. 1 is a view showing a longitudinal section of a hand held power tool which is formed as a drill screwdriver.

FIG. 1 shows a longitudinal section of the hand held power tool formed as a drilling tool, as an impact drilling tool or as an electrical screwdriver with an adjustable torque. The power tool has a machine housing which is identified with reference numeral 10 and accommodates a not shown electric motor for driving a tool spindle 12 through a transmission 11. The tool spindle 12 carries a threaded pin 121 at its one end. A tool holder, in particular a drill chuck, is screwable on the threaded pin 121 for mounting of drills, impact drills or various screw tools. In a drive chain between the electric motor and the tool spindle 12, a torque coupling 13 is arranged. Its maximum transmittable torque is preselectable by an adjusting member 19.

The coupling 13 has a first coupling part 15 with a transmission ring 16 which is fixedly connected at its end side and held axially displaceably. A second coupling part 18 is formed by a hollow gear 17 of the transmission 11 formed as a planetary transmission.

The first coupling part 15 and the second coupling part 18 are in a rotary-locked engagement with one another. An arcuate first transmission member 161 arranged on the transmission 16 at an end side engages in corresponding end-side recesses 182 of the second coupling part 18. The recesses 182 are laterally limited in a rotary direction of the coupling 13 by the second transmission members 181, as can be seen from FIGS. 2 and 4. The interengagement of the transmission members 161, 181 is activated by a coupling spring 20. The coupling spring is supported on the one side on claws 162 of the transmission ring 16 and on the other side on the adjusting member 19, and tensions the transmitting ring 16 in the engaging direction of the coupling 13. The engaging member 19 is connected with the first coupling part 15 through a thread 151. By turning the adjusting member 19 relative to the first coupling part 15, the adjusting member 19 can be brought to the axial position in a direction which is shown in a broken line in FIG. 1, in which the coupling spring 20 is compressed and thereby a high tensioning is applied through the transmission ring 16. By turning the adjusting ring 19 the torque transmitted through the coupling is therefore adjustable.

In the shown example, the coupling 13 serves for producing a rotary-locked connection between the first coupling part 15 and the hollow gear 17. A torque is transmitted from a sun gear 11*a* of the transmission 11 through planetary gears 21, a planetary gear carrier 21*a* to a planetary gear carrier 22 when the coupling 13 is engaged. The hollow gear 17 is for this purpose rotatably supported relative to a transmission housing 24. The first coupling part 15 is formed as a coupling housing 25. It is connected rotary-fixed with the transmission housing 24 and the machine housing 10. The inventive coupling 15 can be arranged however in principle also between the two rotatable parts of the drive train.

The torque is transmitted from the planetary gear carrier 22 through a claw coupling 26 to the tool spindle 12. An arresting disk 31 is arranged non rotatably and axially non displaceably on the tool spindle 12. Together with an engaging gear 32 which is arranged non rotatably and axially displaceably in the coupling housing 25, it forms an impact mechanism 30 which when needed can be turned on and act with an impact on the tool spindle 12.

Figure 2:
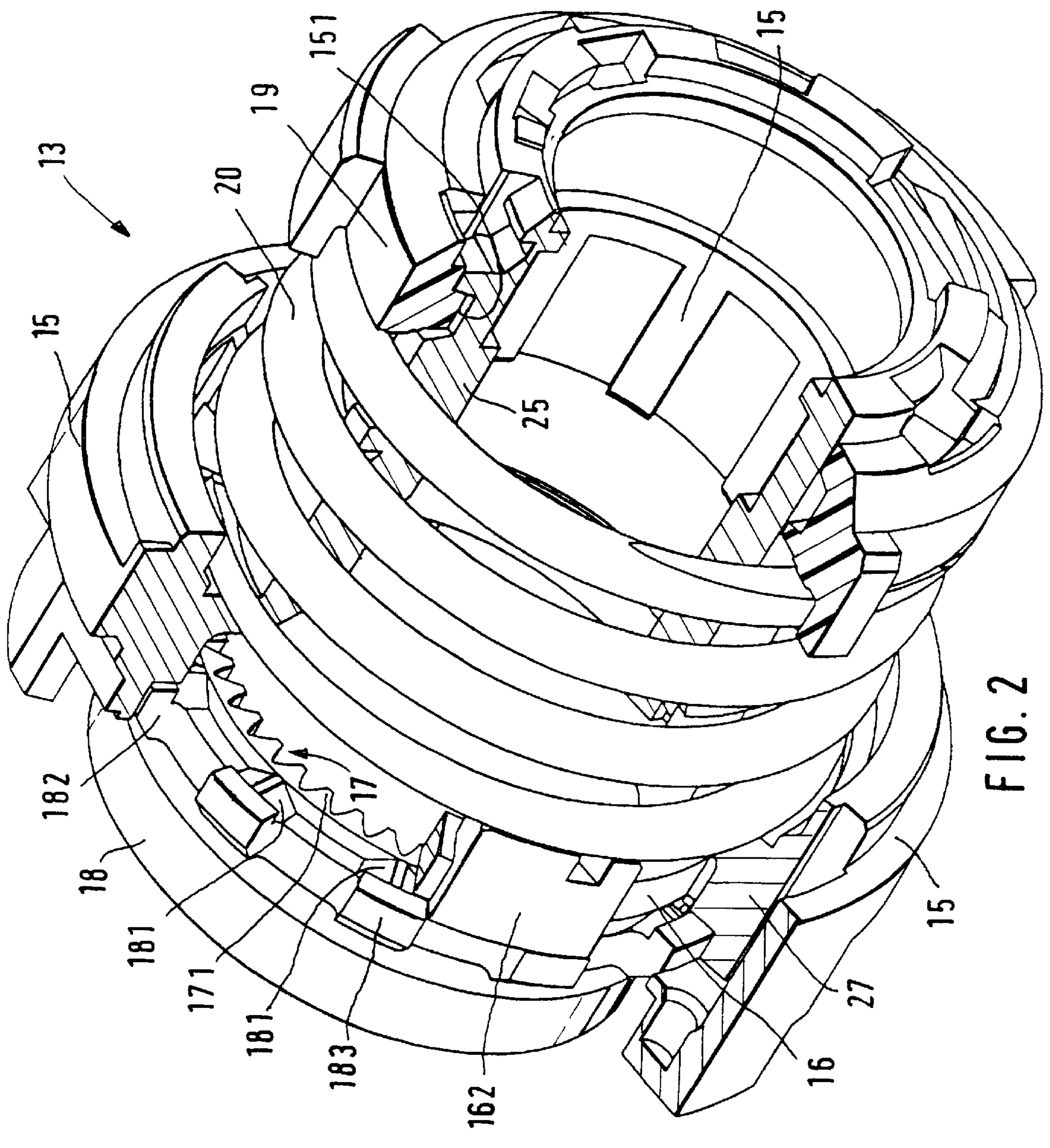
FIG. 2 is a perspective view of a coupling of the hand held power tool of FIG. 1, partially sectioned.

The coupling 13 is shown in FIG. 2 in a perspective view, partially sectioned. The adjusting member 19 engages in the thread 151 of the coupling housing 25, which on its side facing away from the adjusting member 19, forms the first coupling part 15. The coupling spring 20 which is supported on the adjusting member 19 acts on the claws 162 of the transmission ring 16 (sectioned in FIG. 2), which is engagement with the second transmission part 181 on the coupling part 18. Teeth 171 are provided on the second transmission part 18 and belong to the hollow gear 17.

Figure 3:
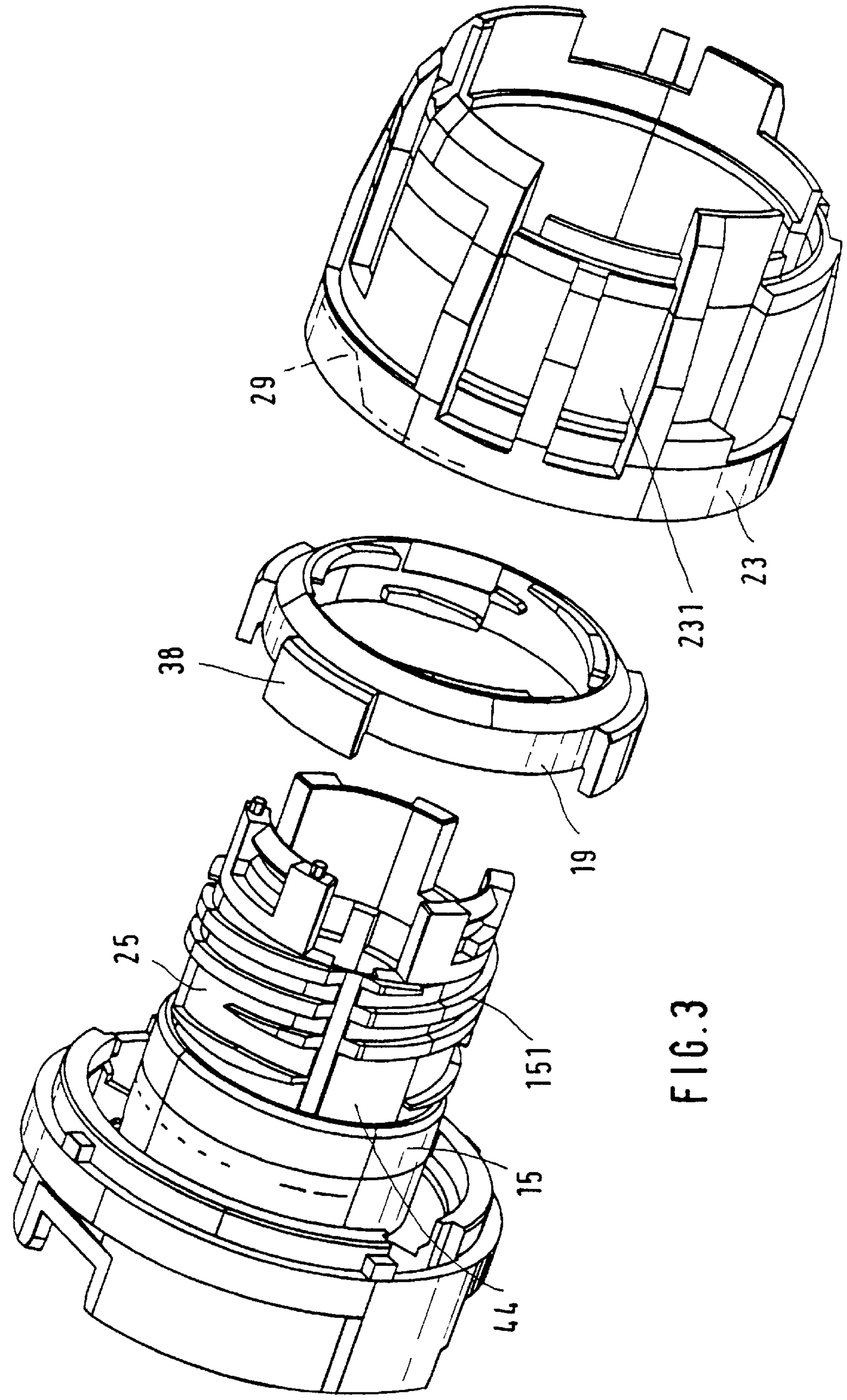
FIG. 3 is an explosion view of the coupling of FIG. 2 with parts of an adjusting member.

FIG. 3 shows the coupling housing 25 with a thread 151. The explosion view of FIG. 3 shows the adjusting member 19 provided with the suitable counterthread 191 and carrying on its outer periphery the driver elements 38. The adjusting member 19 is rotatable through the driver elements 38 by means of an adjusting sleeve 23.

Figure 4:
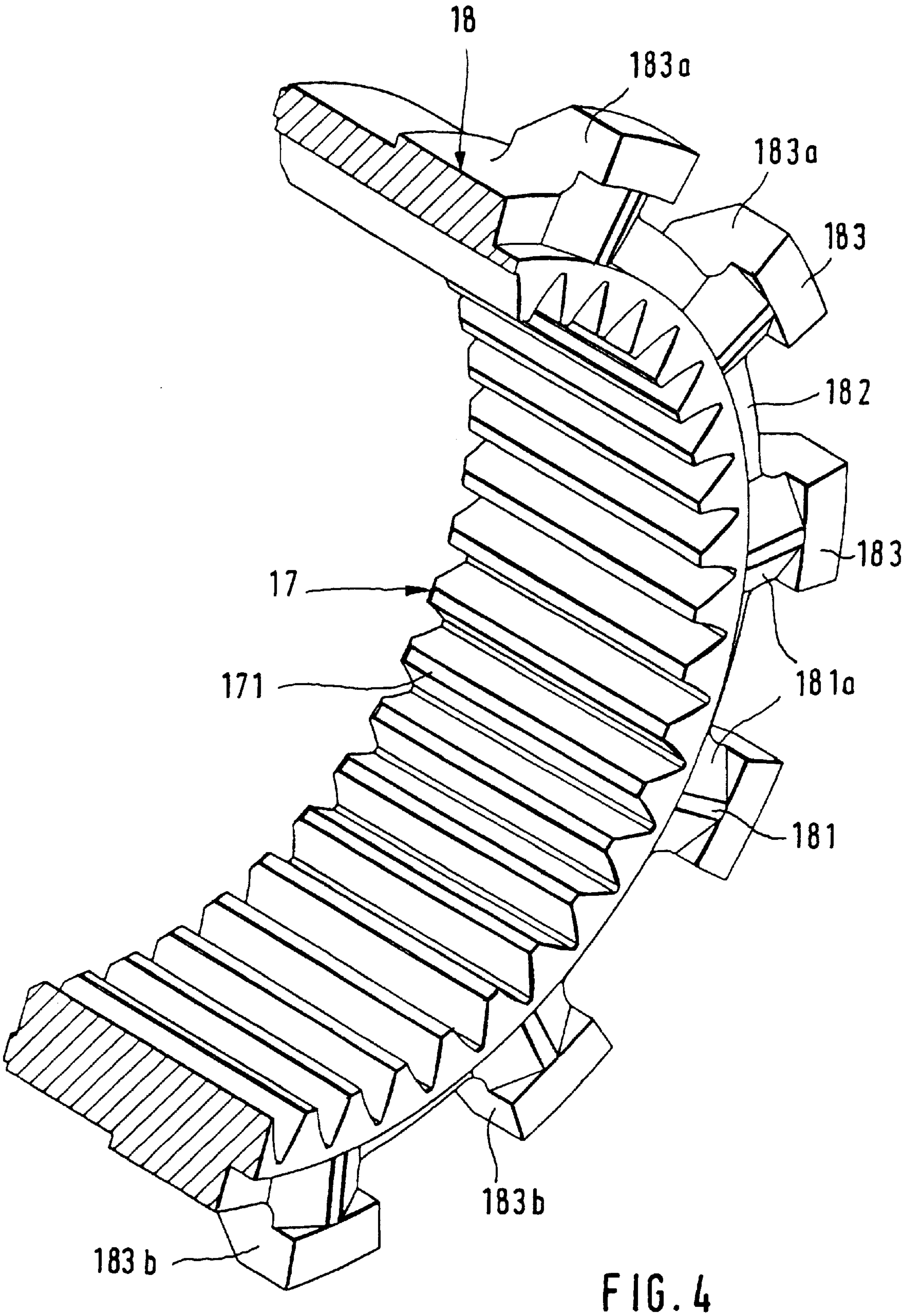
FIG. 4 is a sectional perspective view of a coupling part of the coupling of FIG. 2.

FIG. 4 shows the hollow gear 17 provided with the teeth 171, and the second coupling part 18 which is arranged at the end side and is formed by the second transmission members 181 and the recesses 182 between them. The second transmission members 181 have transmission surfaces 181*a* which are inclined to the rotary direction, and on which the first transmission members 161 can slide.

Figure 5B:
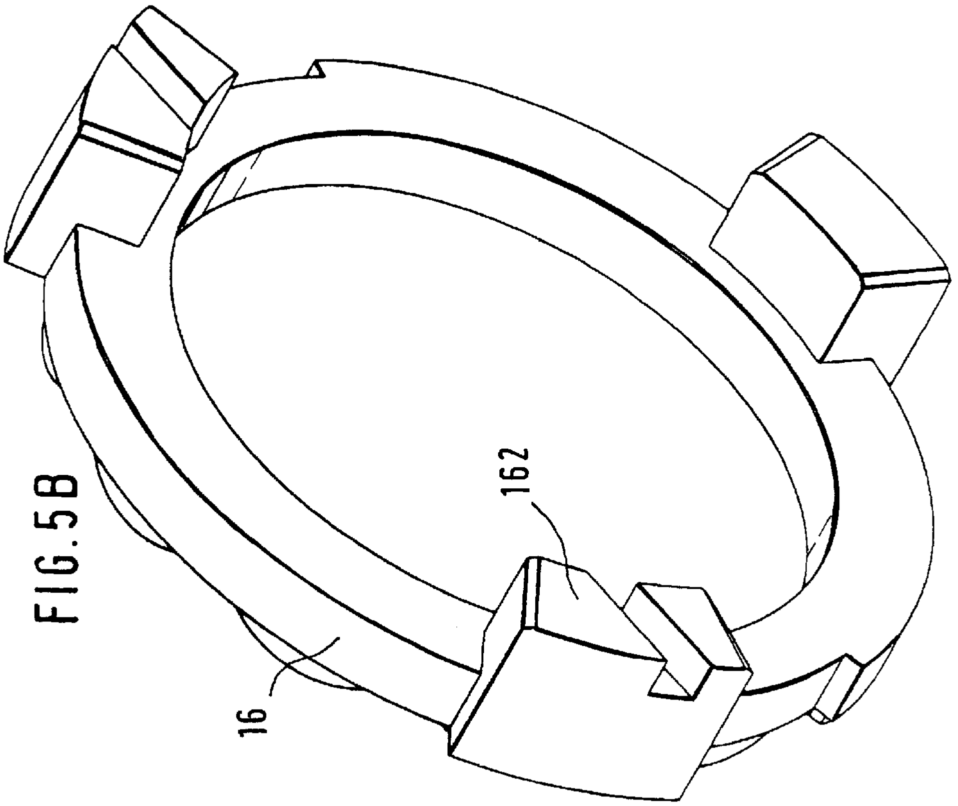
FIGS. 5A and 5B provide a perspective view of another coupling part of the coupling of FIG. 2 in two different views.
Figure 5A:
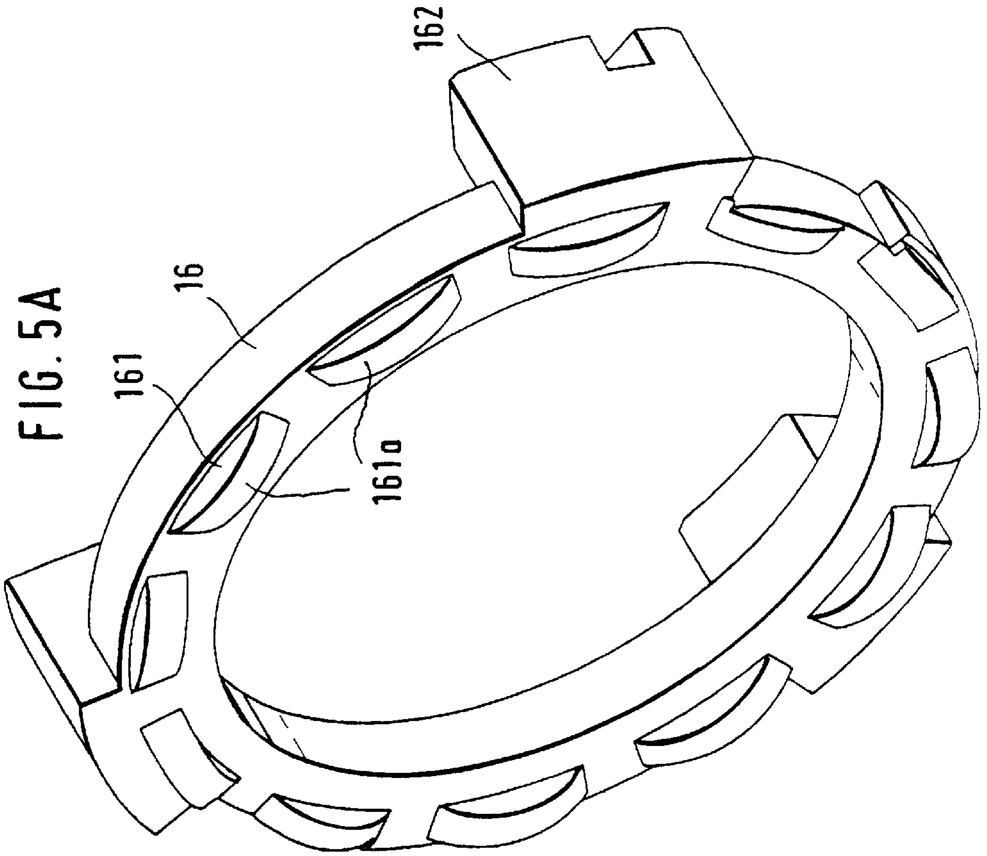

FIGS. 5*a*, 5*b* show two views of the transmission ring 16 which carries the arc-shaped transmission members 161. The transmission members 161 form in turn the transmission surfaces 161*a*. At the rear side of the transmission members 161, three claws 162 are provided. The spring force can be applied through the claws as a tensioning force to the transmission ring 161. Instead of a one-piece transmission ring 16 with several transmission members 161, also several transmission members can be provided, for example with separate claws 162 and formed for example as arresting balls, which are rotary-fixed on the first coupling part 15.

Figure 6:
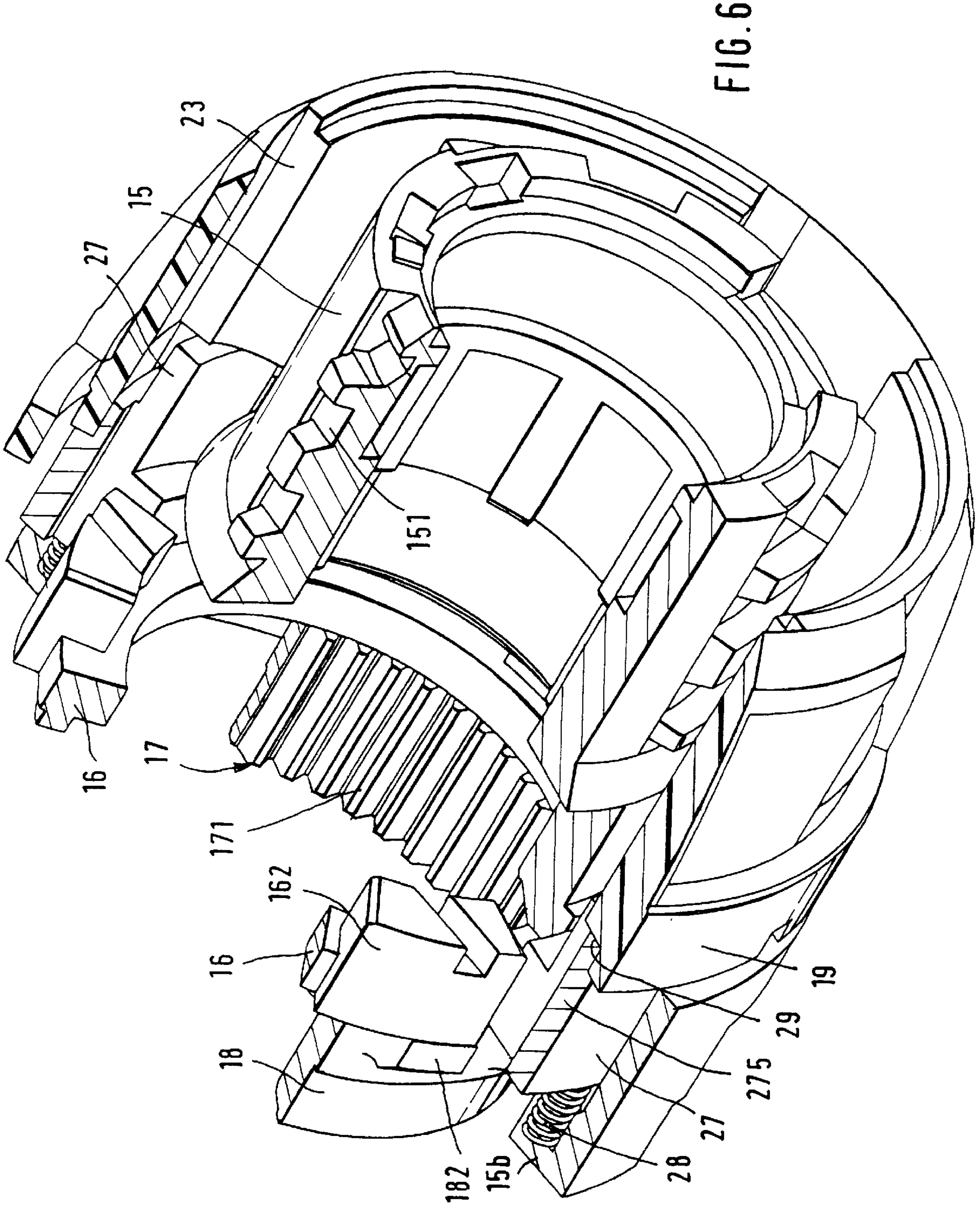
FIG. 6 is a perspective view of the coupling of FIG. 2 with parts of an adjusting member of FIG. 3, partially sectioned.

FIG. 6 shows two additional blocking sliders 27 which are axially displaceably supported in the first coupling part 15 in a ring collar 15*a*. The blocking sliders 27 are tensioned by a spring 28 in direction to the adjusting member 19. The springs 28 are supported on one hand on a projection 15*b* of the coupling part and on the other hand on the blocking sliders 27. The springs 28 hold the blocking sliders 27 always in abutment against a curved track 29 which is mounted at the end side on the adjusting sleeve 23 and identified in FIG. 3 by a broken line. The curved track 29 has different axial positions, so that during turning of the adjusting sleeve 23 relative to the first coupling part 15, the blocking sliders 27 also assume different axial positions.

Figure 7A:
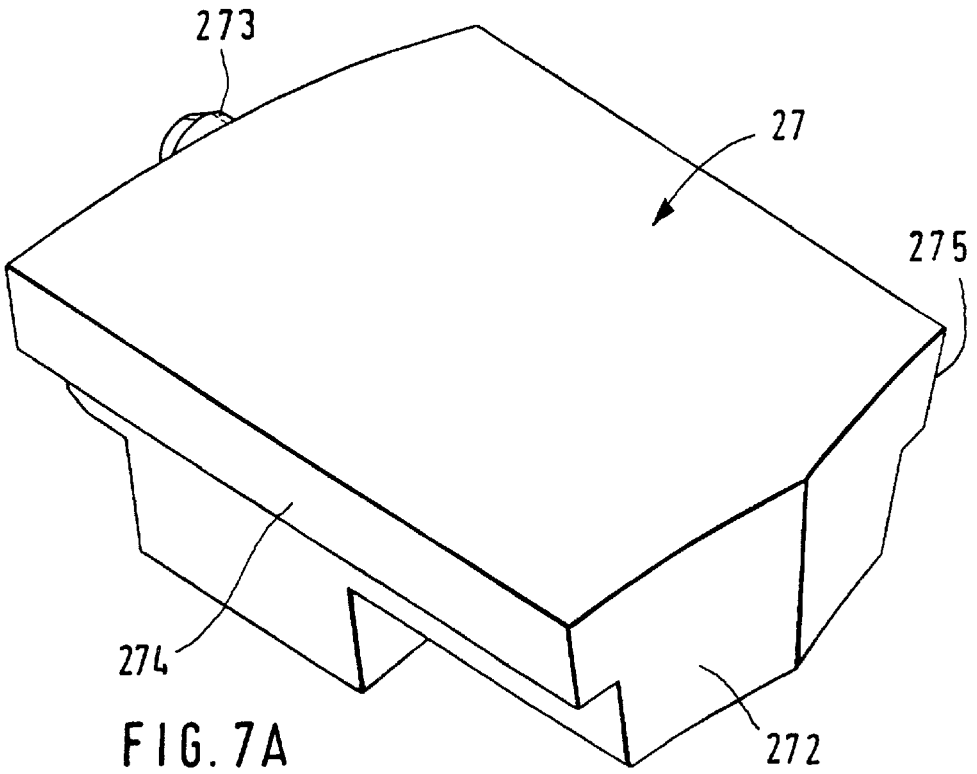
FIGS. 7A and 7B provide a perspective view of a blocking slider of the coupling in two different views.
Figure 7B:
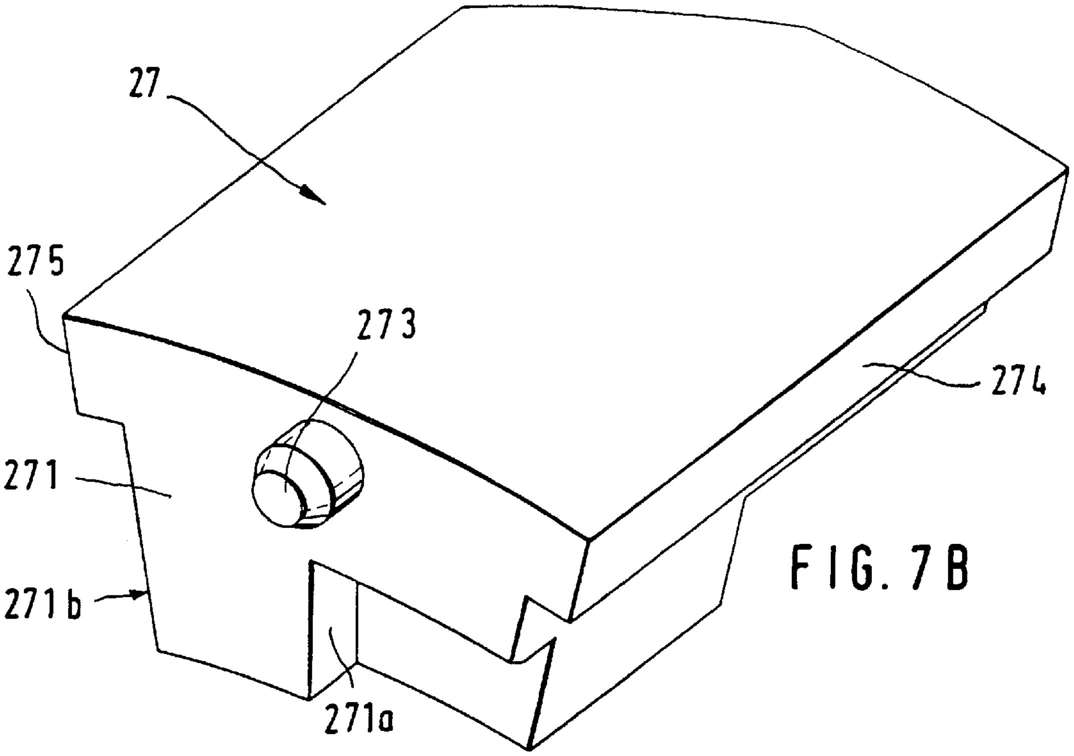

One of the blocking members 27 as shown in FIGS. 7*a* and 7*b* on different views. In FIG. 7*a* an abutment surface 272 is shown, which serves for supporting on the curve track 29. A bearing pin 273 for the spring 28 is arranged at the opposite side of the abutment surface 272. Laterally guiding surfaces 274 and 275 provide the axial displaceability and secure the rotary position of the blocking slider 27.

The blocking members 271 formed on the blocking sliders 27 are shown in FIG. 7*b*. They engage for blocking, or in other words for rotary-fixed coupling of the coupling 13, between second blocking members 183 on the second coupling part 18 as shown in FIG. 4, when the adjusting sleeve 23 with the curved track 29 is brought to a corresponding rotary position.

The first blocking members 271 have lateral blocking surfaces 271*a, b* which are located substantially perpendicular to the rotary position of the hollow gear 17. The second blocking members 183 are provided laterally also with corresponding blocking surfaces 183*a, b,* which are located perpendicular to the rotary direction. Due to the position of the blocking surfaces 183*a, b,* and 271*a, b* perpendicular to the rotary direction, no pressing force is applied in the engaging position to the blocking slider 27. In other words the blocking member 183, 271 remain always in engagement, independently from the transmitting torque. The torque turning-off of the coupling 13 is thereby inoperative.

Figure 8:
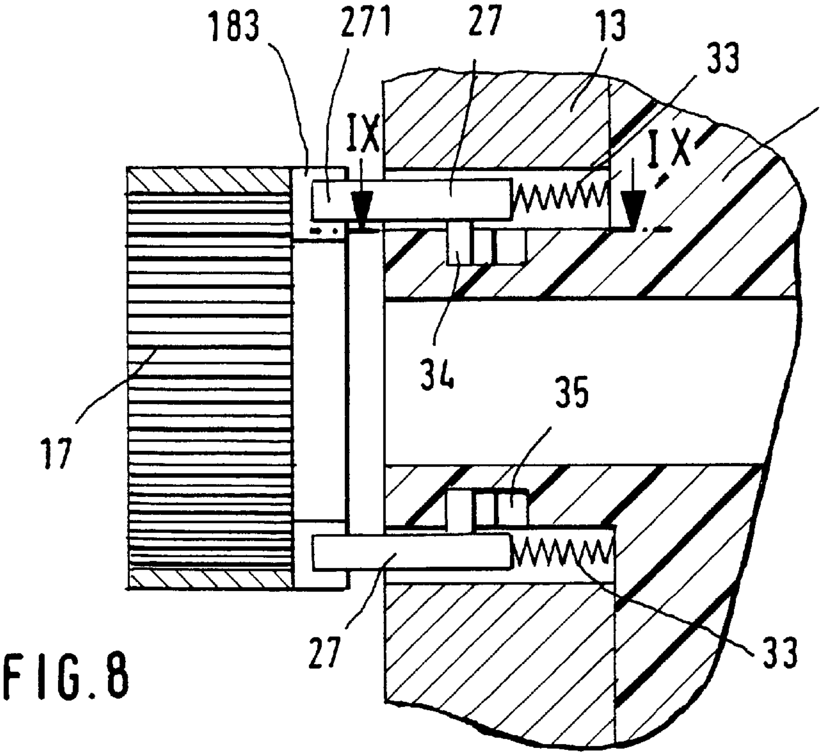
FIG. 8 schematically shows a blocking coupling in accordance with a second embodiment.
Figure 9:
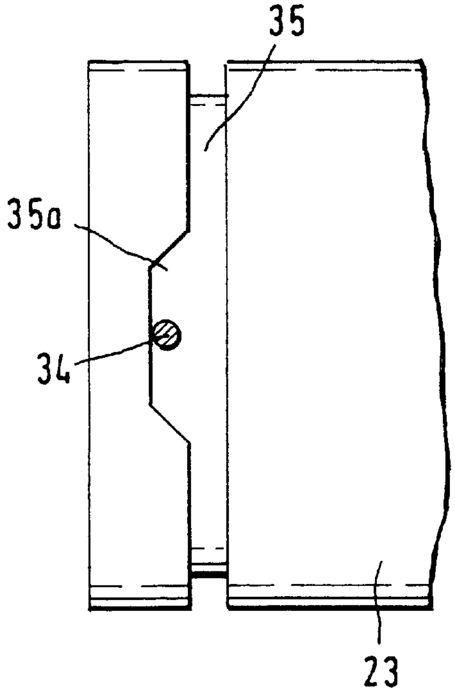
FIG. 9 is a control curve of the coupling of FIG. 8.

FIGS. 8 and 9 show a second embodiment of the present invention. The same parts which are provided in the first embodiment is identified with the same reference numerals. In contrast to the first embodiment, the blocking part of the coupling 13 is provided additionally with the function of a safety turning off. The blocking surfaces 183*a, b* and 271*a, b* are arranged for this purpose similarly to the transmission surfaces 161*a,* 181*a* at an acute angle to the rotary direction, so that an axial force component is produced during a torque transmission. The orientation of the blocking surfaces 183*a, b* and 271*a, b* is selected so that in the event of a maximum torque, the blocking members 183 and 271 are disengaged, so that the rotary transmission is interrupted. This is achieved in that the blocking members 183, 271 are more difficult to overengage than the transmission members 161, 181.

The blocking sliders 27 are acted upon by an engagement spring 33 in direction to the engaging position of the blocking members 183, 271. The blocking sliders 27 are provided with a pin 34 which engages in a circumferential control groove 35 in the adjusting sleeve 23. The control groove 35 has a widening 35*a* in the engaging position of the blocking slider 27, which provides the pin 34 with an axial gap required for the overengaging. For providing the torque turning off the adjusting sleeve 19 is turned in the circumferential direction until the pin 34 during the transition from the widening 35*a* into the nearly located control groove 35 is axially pulled back. Therefore the blocking coupling is released and the torque coupling of the first embodiment which is not shown in FIGS. 8 and 9 acts correspondingly for the transmittable torque.

It will be understood that each of the elements described above, or two or more together, may also find a useful application in other types of constructions differing from the types described above.

While the invention has been illustrated and described as embodied in hand-held power tool, in particular drilling screwdriver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A hand held power tool, comprising a coupling for transmission of torques of different values up to a maximum value and including at least two coupling parts provided with transmission members for rotary-fixed connection with one another; a coupling spring having an adjustable tensioning force, via an adjusting member, and operatable for holding one of said transmission members of one of said coupling parts in a rotary-locked engagement with another of said transmission members of another of said coupling parts; and blocking members with which said coupling parts are rotary-fixed coupled in addition to said transmission members, and said blocking members are non-rotatably and axially-displaceably disposed on one of said coupling parts and are bringable in engagement with blocking surfaces on the other one of said coupling parts via an adjusting sleeve in a drilling operation or an impact drilling operation and then remain in engagement independently from the value of the transmitting torque.

2. A hand held power tool as defined in claim 1, wherein said transmitting members have transmission surfaces provided for a torque transmission and arranged relative to a rotary direction of said coupling so that during a torque transmission a torque-dependent disengagement force acts against a force of said coupling spring on said transmission members.

3. A hand held power tool as defined in claim 1, wherein a first one of said coupling parts has a plurality of first of said transmission members formed on a transmission ring which is urged by said coupling spring to an engaging position with second of said transmission members of a second one of said coupling parts.

4. A hand held power tool as defined in claim 3, wherein said transmission ring is coupled with said first coupling part non-rotatably and axially displaceably.

5. A hand held power tool as defined in claim 3, wherein said first coupling part is formed as a coupling housing and said second coupling part is non-rotatably connected with a hollow gear of a planetary transmission.

6. A hand held power tool as defined in claim 5, wherein said second coupling part is connected of one-piece with said hollow gear, said second transmitting members being provided on an end side of said hollow gear.

7. A hand held power tool as defined in claim 3; wherein said adjusting member is axially displaceable through a thread relative to said first coupling part.

8. A hand held power tool as defined in claim 1, wherein said blocking members have blocking surfaces for a torque transmission, which are arranged relative to a rotary direction of said coupling.

9. A hand held power tool as defined in claim 8, wherein said blocking surfaces are located substantially transversely to a rotary direction of said coupling.

10. A hand held power tool as defined in claim 8, wherein said blocking surfaces include first blocking surfaces formed on at least one blocking slider which is supported displaceably relative to said first coupling part.

11. A hand held power tool as defined in claim 10, wherein said blocking surfaces include second blocking surfaces which are formed on said second coupling part.

12. A hand held power tool as defined in claim 10; wherein said adjusting sleeve is provided with a curved track; and an additional spring arranged so that said blocking slider is urged by said additional spring against said curved track of said adjusting sleeve.

13. A hand held power tool as defined in claim 12, wherein said adjusting sleeve is formed so that said adjusting sleeve controls both a tensioning of said coupling spring and an engagement and disengagement of said blocking members.

14. A hand held power tool as defined in claim 1, wherein said blocking members are provided with blocking surfaces for a torque transmission, said blocking surfaces being arranged relative to a rotary direction of said coupling so that during a transmission of a maximum permissible torque an overengagement of said blocking members is performed.

* * * * *